(12) United States Patent
Kang et al.

(10) Patent No.: US 11,762,503 B2
(45) Date of Patent: Sep. 19, 2023

(54) TOUCH DRIVING CIRCUIT AND TOUCH DISPLAY DEVICE

(71) Applicant: LG Display Co., Ltd., Seoul (KR)

(72) Inventors: HyeongWon Kang, Seoul (KR); Beom-Jin Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/978,766

(22) Filed: Nov. 1, 2022

(65) Prior Publication Data

US 2023/0185403 A1    Jun. 15, 2023

(30) Foreign Application Priority Data

Dec. 9, 2021  (KR) .......................... 10-2021-0175282

(51) Int. Cl.
*G06F 3/041* (2006.01)
(52) U.S. Cl.
CPC ................................ *G06F 3/04166* (2019.05)

(58) Field of Classification Search
CPC .. G06F 3/04166; G06F 3/0418; G06F 3/0412; G06F 3/044
See application file for complete search history.

(56) References Cited

U.S. PATENT DOCUMENTS

2019/0095031 A1*  3/2019  Lee ........................ G06F 3/0445

* cited by examiner

*Primary Examiner* — Priyank J Shah
(74) *Attorney, Agent, or Firm* — Fenwick & West LLP

(57) ABSTRACT

Embodiments of the disclosure relate to a touch driving circuit and a touch display device. There may be provided a touch driving circuit capable of attenuating noise in the touch sensing signal and enhancing the output signal by the integrator by transferring charge through a sample-and-hold driving path and a bypass driving path, inverting the polarity of the charge sampled by the sampling switching block, and increasing the number of times of sampling. Further, as the amount of charge transferred by the offset voltage control switch included in the sample-and-hold driving path and bypass driving path may be adjusted within an offset voltage range, the performance of touch sensing may be enhanced.

20 Claims, 10 Drawing Sheets

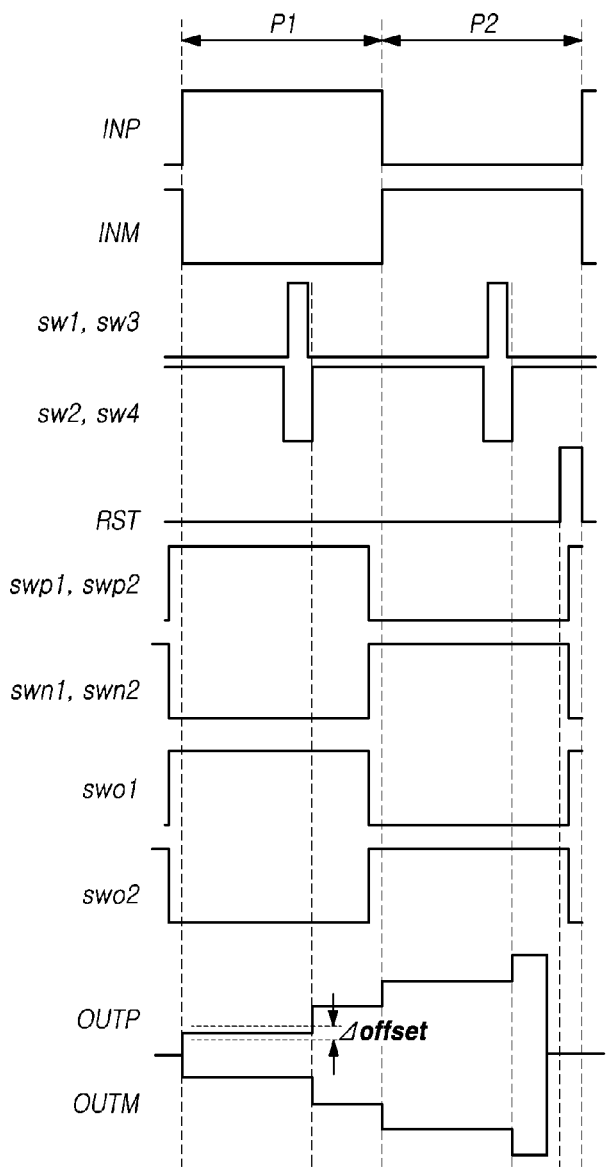

TOUCH DRIVING CIRCUIT AND TOUCH DISPLAY DEVICE

CROSS-REFERENCE TO RELATED APPLICATION

This application claims priority from Republic of Korea Patent Application No. 10-2021-0175282, filed on Dec. 9, 2021, which is hereby incorporated by reference in its entirety.

BACKGROUND

Field

Embodiments of the disclosure relate to a touch driving circuit and a touch display device.

Description of Related Art

The display device recognizes the user's touch on the display panel and performs input processing based on the recognized touch so as to provide more various functions to the user.

The display device may include touch electrodes disposed on the display panel and touch lines for driving the touch electrodes. The display device may sense the user's touch by driving the touch electrode and detecting a change in capacitance by the user's touch.

The display panel may include various electrodes and signal lines for display driving as well as the touch electrodes and touch lines. A parasitic capacitance may be formed between the touch electrode and the touch line for touch sensing and the electrode and line for display driving and may degrade the performance of touch sensing.

SUMMARY

Embodiments of the disclosure may provide a touch driving circuit and a touch display device capable of enhancing the sensitivity of touch sensing while reducing the noise of a touch sensing signal.

Embodiments of the disclosure may provide a touch display device comprising: a plurality of touch electrodes included in a display panel; a plurality of touch lines supplying a touch driving signal to at least one of the plurality of touch electrodes; and a touch driving circuit configured to drive the plurality of touch lines, the touch driving circuit including: a first sampling block configured to receive a first signal transferred through a first touch line from the plurality of touch lines, the first sampling block including a first sample-and-hold driving path that is configured to sample the first signal and a first bypass driving path that is configured to bypass the first sample-and-hold driving path and output the first signal; a second sampling block configured to receive a second signal transferred through a second touch line from the plurality of touch lines, the second sampling block including a second sample-and-hold driving path that is configured to sample the second signal and a second bypass driving path that is configured to bypass the second sample-and-hold driving path and output the second signal; a sampling switching block including a first input terminal and a second input terminal, the first input terminal electrically connected with the first sample-and-hold driving path and the second bypass driving path, and the second input terminal electrically connected with the second sample-and-hold driving path and the first bypass driving path; and a differential amplifier electrically connected with an output terminal of the sampling switching block.

Embodiments of the disclosure may provide a touch driving circuit comprising: a first sampling block configured to receive a first signal transferred through a first touch line, the first sampling block including a first sample-and-hold driving path that is configured to sample the first signal and a first bypass driving path that is configured to bypass the first sample-and-hold driving path and output the first signal; a second sampling block configured to receive a second signal transferred through a second touch line, the second sampling block including a second sample-and-hold driving path that is configured to sample the second signal and a second bypass driving path that is configured to bypass the second sample-and-hold driving path and output the second signal; a sampling switching block including a first input terminal electrically and a second input terminal, the first input terminal connected with the first sample-and-hold driving path and the second bypass driving path, and the second input terminal electrically connected with the second sample-and-hold driving path and the first bypass driving path; and a differential amplifier electrically connected with an output terminal of the sampling switching block.

In one embodiment, a touch display device comprises: a plurality of touch electrodes included in a display panel; a plurality of touch lines supplying a touch driving signal to at least one of the plurality of touch electrodes; and a touch driving circuit configured to drive the plurality of touch lines, the touch driving circuit including: a plurality of sampling blocks, each sampling block connected to a corresponding touch line from the plurality of touch lines; a differential amplifier including a plurality of input terminals and an output terminal; and a switch block having a plurality of input terminals that are connected to the plurality of sampling blocks and a plurality of output terminals that are connected to the plurality of input terminals of the differential amplifier, the switch block configured to switch connection of each of the plurality of sampling blocks to different input terminals of the plurality of input terminals of the differential amplifier, wherein each of the plurality of sampling blocks is configured to either sample a touch sensing signal on the corresponding touch line that is connected to the sampling block or bypass the touch sensing signal to the switch block, and a magnitude of an output signal at the output terminal of the differential amplifier is based on a number of times each of the plurality of sampling blocks sample the touch sensing signal.

According to embodiments of the disclosure, there may be provided a touch driving circuit and touch display device capable of enhancing the performance of touch sensing by increasing the integral value of the touch sensing signal using the sample-and-hold driving path and bypass driving path and reducing noise by the driving of the sampling switching block.

DESCRIPTION OF DRAWINGS

The above and other objects, features, and advantages of the disclosure will be more clearly understood from the following detailed description, taken in conjunction with the accompanying drawings, in which:

FIG. 10 is a view illustrating another example of a driving scheme of an integrator according to embodiments of the disclosure.

DETAILED DESCRIPTION

Figure 1:
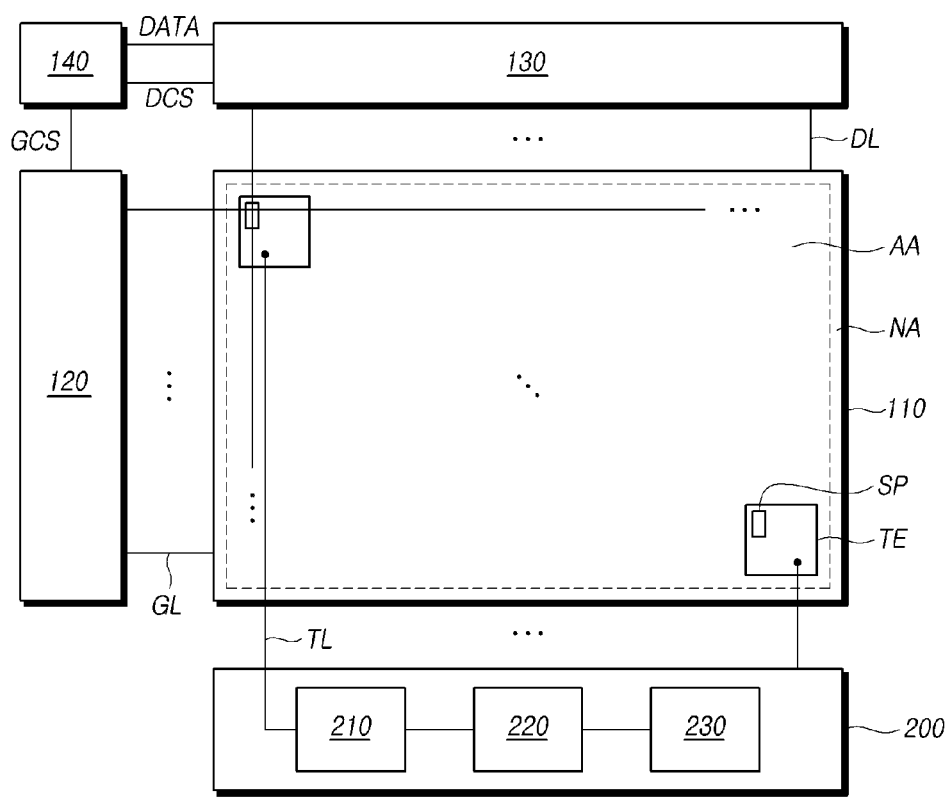
FIG. 1 is a view schematically illustrating a configuration of a touch display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to accompanying drawings.

FIG. 1 is a view schematically illustrating a configuration of a touch display device 100 according to embodiments of the disclosure.

Referring to FIG. 1, a touch display device 100 may include a display panel 110, a gate driving circuit 120, a data driving circuit 130, and a controller 140 for driving the display panel 110.

The touch display device 100 may include a plurality of touch electrodes TE disposed on the display panel 110 for touch sensing. The touch display device 100 may include a touch driving circuit 200 that drives the touch electrode TE and performs touch sensing.

The display panel 110 may include an active area AA in which a plurality of subpixels SP are disposed and a non-active area NA positioned outside the active area AA. Each of the plurality of touch electrodes TE may be disposed in an area corresponding to two or more subpixels SP.

A plurality of gate lines GL and a plurality of data lines DL may be disposed on the display panel 110. The subpixels SP may be located where the gate lines GL and the data lines DL cross each other. A plurality of touch lines TL electrically connected to the touch electrodes TE may be disposed on the display panel 110.

A configuration for display driving in the touch display device 100 is described. The gate driving circuit 120 may be controlled by the controller 140 to sequentially output scan signals to the plurality of gate lines GL disposed in the display panel 110, controlling the driving timing of the subpixels SP.

The gate driving circuit 120 may include one or more gate driver integrated circuits (GDICs). Depending on driving schemes, the gate driving circuit 120 may be positioned on only one side, or each of two opposite sides, of the display panel 110.

Each gate driver integrated circuit GDIC may be connected to a bonding pad of the display panel 110 using a tape automated bonding (TAB) method or a chip on glass (COG) method. Alternatively, each gate driver integrated circuit GDIC may be implemented in a gate in panel (GIP) type and be disposed directly on the display panel 110. Alternatively, each gate driver integrated circuit GDIC may be integrated and disposed on the display panel 110. Each gate driver integrated circuit (GDIC) may also be implemented in a chip-on-film (COF) scheme to be mounted on a film connected to the display panel 110.

The data driving circuit 130 receives image data from the controller 140 and converts the image data into an analog data voltage. The data driving circuit 130 outputs a data voltage to each data line DL according to the timing at which a scan signal is applied through the gate line GL, allowing each subpixel SP to represent a brightness according to the image data.

The data driving circuit 130 may include one or more source driver integrated circuits (SDICs).

Each source driver integrated circuit (SDIC) may include, e.g., shift registers, latch circuits, digital-analog converters, and output buffers.

Each source driver integrated circuit SDIC may be connected to a bonding pad of the display panel 110 using a tape automated bonding (TAB) method or a chip on glass (COG) method. Alternatively, each source driver integrated circuit SDIC may be directly disposed on the display panel 110. Alternatively, each source driver integrated circuit SDIC may be integrated and disposed on the display panel 110. Alternatively, each source driver integrated circuit SDIC may be implemented by a chip on film (COF) method. In this case, each source driver integrated circuit SDIC may be mounted on a film connected to the display panel 110 and may be electrically connected to the display panel 110 through lines on the film.

The controller 140 may supply various control signals to the gate driving circuit 120 and the data driving circuit 130 and control the operation of the gate driving circuit 120 and the data driving circuit 130.

The controller 140 may be mounted on a printed circuit board or a flexible printed circuit and may be electrically connected with the gate driving circuit 120 and the data driving circuit 130 through the printed circuit board or the flexible printed circuit.

The controller 140 enables the gate driving circuit 120 to output scan signals according to the timing set in each frame, converts image data received from the outside to meet the data signal format used by the data driving circuit 130, and outputs the resultant image data to the data driving circuit 130.

The controller 140 receives, from the outside (e.g., a host system), various timing signals including a vertical synchronization signal VSYNC, a horizontal synchronization signal HSYNC, an input data enable signal DE, and a clock signal, along with the image data.

The controller 140 may generate a diversity of control signals using the timing signals received from the outside and output the control signals to the gate driving circuit 120 and the data driving circuit 130.

As an example, to control the gate driving circuit 120, the controller 140 outputs various gate control signals GCS including a gate start pulse GSP, a gate shift clock GSC, and a gate output enable signal GOE.

The gate start pulse GSP controls the operation start timing of one or more gate driver integrated circuits GDICs constituting the gate driving circuit 120. The gate shift clock GSC is a clock signal commonly input to one or more gate driver integrated circuits GDICs and controls the shift timing of the scan signals. The gate output enable signal GOE designates timing information about one or more gate driver integrated circuits GDICs.

To control the data driving circuit 130, the controller 140 outputs various data control signals DCS including, for example, a source start pulse SSP, a source sampling clock SSC, and a source output enable signal SOE.

The source start pulse SSP controls the data sampling start timing of one or more source driver integrated circuits SDICs constituting the data driving circuit 130. The source sampling clock SSC is a clock signal for controlling the sampling timing of data in each source driver integrated circuit (SDIC). The source output enable signal SOE controls the output timing of the data driving circuit 130.

The touch display device 100 may further include a power management integrated circuit that supplies various voltages or currents to, e.g., the display panel 110, the gate driving circuit 120, and the data driving circuit 130 or controls various voltages or currents to be supplied.

A configuration for touch sensing in the touch display device 100 is described. The touch display device 200 may drive a plurality of touch electrodes TE disposed on the display panel 110.

The touch driving circuit 200 may supply a touch driving signal to the touch electrode TE through the touch line TL and may receive a touch sensing signal from the touch electrode TE.

The touch driving circuit 200 may include various components for driving the touch electrode TE, processing the touch sensing signal, and transmitting it to the outside. For example, the touch driving circuit 200 may include a sensing unit 210 (e.g., a circuit), an integrator 220 (e.g., a circuit), and an analog-to-digital converter 230.

The sensing unit 210 may supply the touch driving signal to the touch line TL and receive the touch sensing signal through the touch line TL. The sensing unit 210 may include a preamplifier and a feedback capacitor. In some cases, the sensing unit 210 may be sequentially connected to two or more touch lines TL through a multiplexer, drive two or more touch electrodes TE, and receive a touch sensing signal.

The integrator 220 may accumulate the charge according to the touch sensing signal obtained by the sensing unit 210. The integrator 220 may output, to the analog-to-digital converter 230, the charge accumulated while the touch sensing is performed.

The analog-to-digital converter 230 may generate digital sensing data based on the charge received from the integrator 220. The digital sensing data generated by the analog-to-digital converter 230 may be transmitted to the touch controller.

The touch controller may control driving of the touch driving circuit 200 and may detect the presence or absence and coordinates of a touch based on the sensing data received from the touch driving circuit 200.

The touch electrode TE may be positioned outside the display panel 110 or may be positioned inside the display panel 110.

When the touch electrode TE is positioned inside the display panel 110, the touch electrode TE may be an electrode disposed separately from an electrode for display driving. Alternatively, the touch electrode TE may be one of the electrodes for display driving.

For example, the touch electrode TE may be an electrode split from the common electrode for display driving.

In this case, the touch electrode TE may function as an electrode for touch sensing and an electrode for display driving.

For example, the touch electrode TE may be driven as a common electrode and a touch electrode TE in temporally split periods. Alternatively, the touch electrode TE may simultaneously function as a touch electrode TE and a common electrode.

In this case, since the touch driving signal is applied to the touch electrode TE during the display driving period, the signal for display driving (e.g., a data voltage or a scan signal) may be supplied in a form modulated based on the touch driving signal.

As another example, the touch electrode TE may be an electrode disposed separately from the electrode for display driving.

An example in which the touch display device 100 is an organic light emitting display device is described. The touch electrode TE may be disposed in various positions depending on the direction in which the touch display device 100 emits light.

When the touch display device 100 has a top emission structure, the touch electrode TE may be disposed on the encapsulation layer that encapsulates the light emitting element included in the display panel 110. When the touch display device 100 has a bottom emission structure, the touch electrode TE may be positioned between the substrate and the layer where the light emitting element is disposed and be positioned on a lower layer than the layer where the thin film transistor positioned under the light emitting element is disposed.

When the touch electrode TE is separately disposed from the electrode for display driving, the touch electrode TE may be driven during a period when display driving is performed and perform touch sensing. Alternatively, to enhance the performance of touch sensing, touch sensing may be performed in a period different from a period when display driving is performed.

Embodiments of the disclosure may also provide a method for enhancing the performance of touch sensing by reducing the influence of the noise due to display driving on the touch sensing signal and enhancing the performance of touch sensing signal detection of the touch driving circuit 200.

Figure 2:
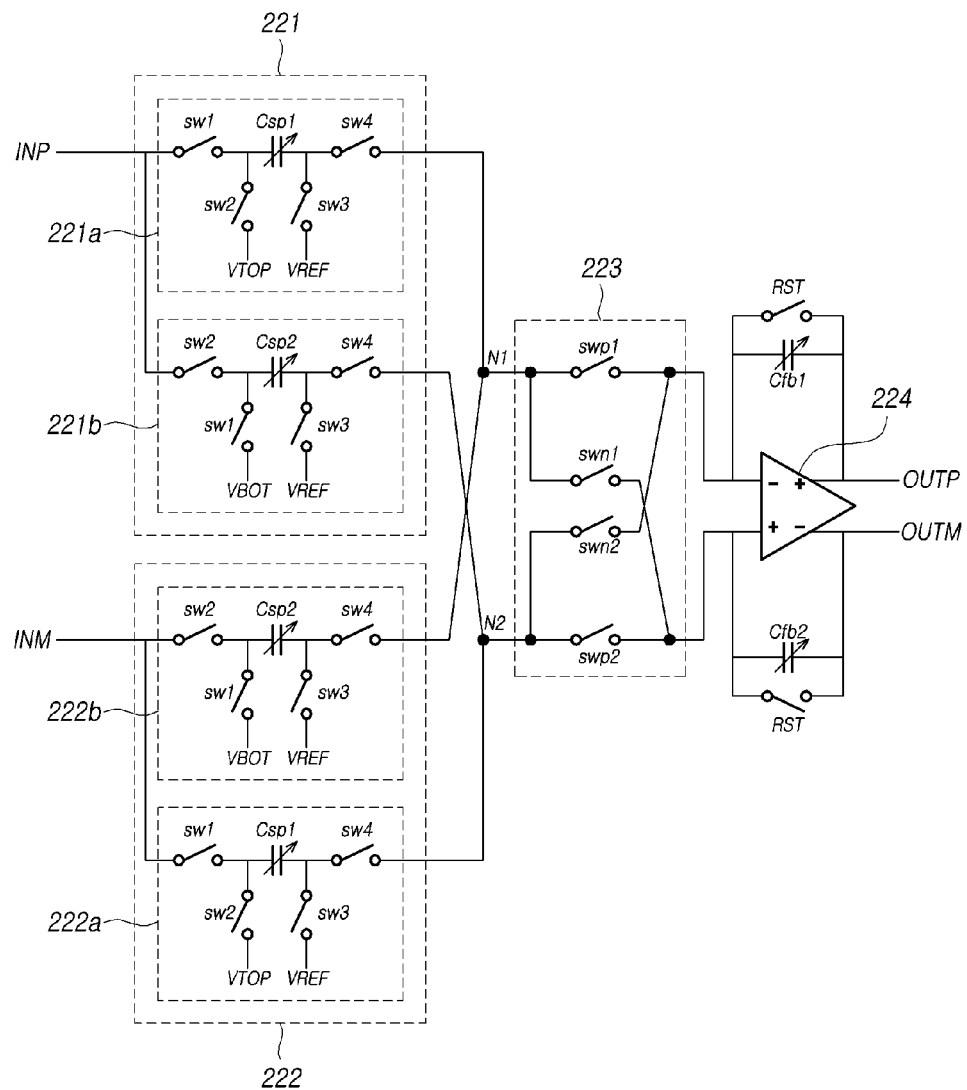
FIG. 2 is a view illustrating an example of a structure of an integrator included in a touch driving circuit of a touch display device according to embodiments of the disclosure.
Figure 3:
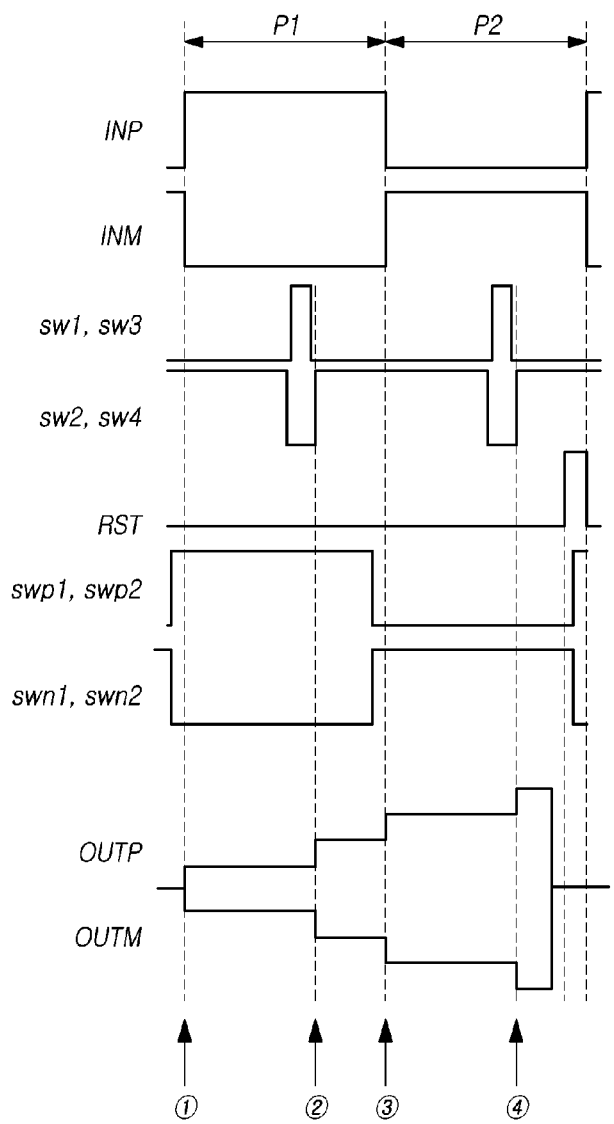
FIGS. 3 and 4 are views illustrating an example of a driving scheme of an integrator according to embodiments of the disclosure.
Figure 4:
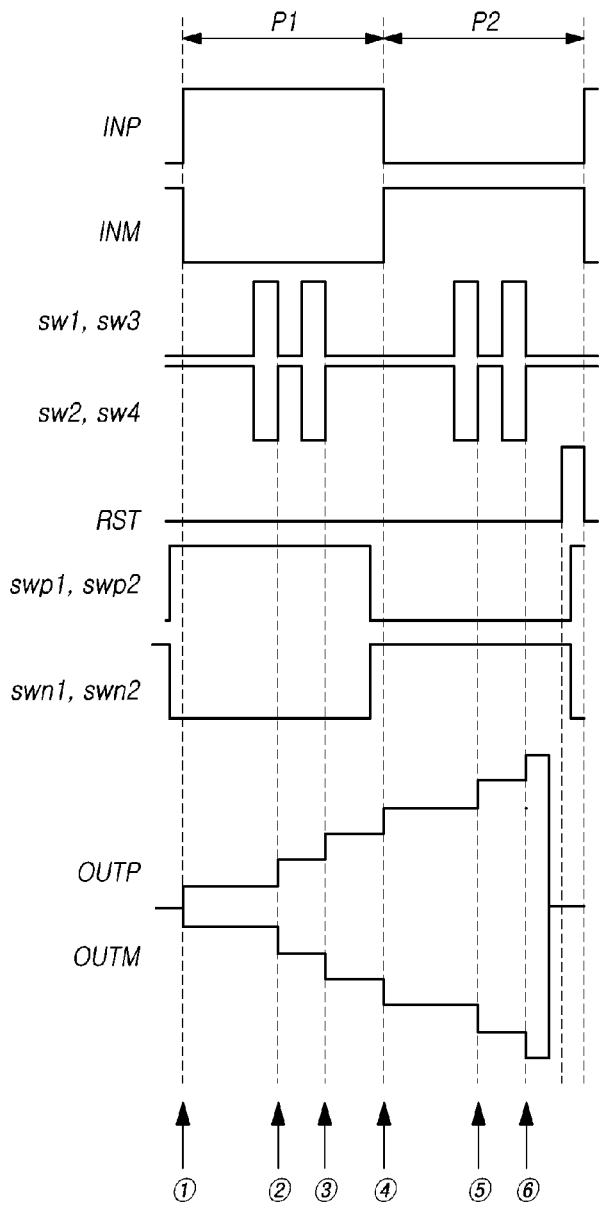

FIG. 2 is a view illustrating an example of a structure of an integrator 220 included in a touch driving circuit 200 of a touch display device 100 according to embodiments of the disclosure. FIGS. 3 and 4 are views illustrating an example of a driving scheme of an integrator 220 according to embodiments of the disclosure. FIGS. 5 to 8 are views illustrating another example of a driving scheme of an integrator 220 according to embodiments of the disclosure.

Referring to FIG. 2, the integrator 220 included in the touch driving circuit 200 may include a first sampling block 221, a second sampling block 222, a sampling switching block 223, and a differential amplifier 224 according to one embodiment.

The first sampling block 221 may receive a first input signal INP. The second sampling block 222 may receive a second input signal INM. The first input signal INP and the second input signal INM may be signals received through different touch lines TL. For example, the first input signal INP may be a signal received through a first touch line, and the second input signal INM may be a signal received through a second touch line. The phase of the first input signal INP may be different from the phase of the second input signal INM.

The first sampling block 221 may include a first sample-and-hold driving path 221a and a first bypass driving path 221b according to one embodiment.

The second sampling block 222 may include a second sample-and-hold driving path 222a and a second bypass driving path 222b according to one embodiment.

Each of the first sample-and-hold driving path 221a and the second sample-and-hold driving path 222a may include a first sampling capacitor Csp1 and a plurality of switches sw1, sw2, sw3, and sw4 according to one embodiment.

In one embodiment, each of the first sample-and-hold driving path 221a and the second sample-and-hold driving path 222a is configured to sample a respective signal received by its sampling block. The first bypass driving path 221b is configured to bypass the first sample-and-hold driving path 221a and output the signal received by the first sampling block 221 to the sampling switching block 223. Similarly, the second bypass driving path 221a is configured to bypass the second sample-and-hold driving path 222a and output the signal received by the second sampling block 222 to the sampling switching block 223. In one embodiment, the sampling switching block 223 is configured to switch connection of each of the sampling blocks to different input terminals of the differential amplifier 224 as will be further described below.

Among the plurality of switches sw1, sw2, sw3, and sw4, the first switch sw1 and the fourth switch sw4 may be connected to two opposite sides of the first sampling capacitor Csp1. For example, the first switch sw1 is connected to a first end of the first sampling capacitor Csp1 and the fourth switch sw4 is connected to a second end of the first sampling capacitor Csp1. The second switch sw2 may be electrically connected to the input terminal of the first auxiliary voltage VTOP and a connection point between the first switch sw1 and the first end of the first sampling capacitor Csp1. The third switch sw3 may be electrically connected to the input terminal of the reference voltage VREF and a connection point between the fourth switch sw4 and the second end of the first sampling capacitor Csp1. The first auxiliary voltage VTOP may be different from the reference voltage VREF. The difference between the first auxiliary voltage VTOP and the reference voltage VREF may increase or decrease the output signal according to the sampled charge.

Each of the first bypass driving path 221b and the second bypass driving path 222b may include a second sampling capacitor Csp2 and a plurality of switches sw1, sw2, sw3, and sw4 according to one embodiment.

Among the plurality of switches sw1, sw2, sw3, and sw4, the second switch sw2 and the fourth switch sw4 may be connected to two opposite sides of the second sampling capacitor Csp2. For example, the second switch sw2 is connected to a first end of the second sampling capacitor Csp2 and the fourth switch sw4 is connected to a second end of the second sampling capacitor Csp2. The first switch sw1 may be electrically connected to the input terminal of the second auxiliary voltage VBOP and a connection point between the second switch sw2 and the first end of the second sampling capacitor Csp2. The third switch sw3 may be electrically connected to the input terminal of the reference voltage VREF and a connection point between the fourth switch sw4 and the second end of the second sampling capacitor Csp2.

The first sample-and-hold driving path 221a and the second bypass driving path 222b may be electrically connected to a first node N1. The first node N1 may be referred to as the first input terminal of the sampling switching block 223.

The second sample-and-hold driving path 222a and the first bypass driving path 221b may be electrically connected to a second node N2. The second node N2 may be referred to as the second input terminal of the sampling switching block 223.

The sampling switching block 223 may include a first positive sampling switch swp1, a first negative sampling switch swn1, a second positive sampling switch swp2, and a second negative sampling switch swn2 in one embodiment.

The first positive sampling switch swp1 may be electrically connected between the first node N1 and a first input terminal of the differential amplifier 224. The first input terminal of the differential amplifier 224 may mean the input terminal electrically connected to the first feedback capacitor Cfb1.

The first negative sampling switch swn1 may be electrically connected between the first node N1 and a second input terminal of the differential amplifier. The second input terminal of the differential amplifier 224 may refer to the input terminal electrically connected to the second feedback capacitor Cfb2.

The second positive sampling switch swp2 may be electrically connected between the second node N2 and the second input terminal of the differential amplifier 224. The second negative sampling switch swn2 may be electrically connected between the second node N2 and the first input terminal of the differential amplifier 224.

The differential amplifier 224 may be electrically connected to the first feedback capacitor Cfb1, the second feedback capacitor Cfb2, and the reset switch RST. The differential amplifier 224 may output a first output signal OUTP and a second output signal OUTM. The differential amplifier 224 may output a signal corresponding to the difference between the first output signal OUTP and the second output signal OUTM to the analog-to-digital converter 230.

An output signal of the integrator 220 may be generated according to operations of the switches included in the first sampling block 221, the second sampling block 222, and the sampling switching block 223.

Referring to FIGS. 2 and 3, FIG. 3 illustrates examples of a driving scheme of the integrator 220 and a signal output by the integrator 220 during one period of the touch driving signal that includes a first period P1 and a second period P2.

The phase of the first input signal INP may be different from the phase of the second input signal INM. In a first period P1 of one period of the touch driving signal, the phase of the first input signal INP may have a positive polarity, and the phase of the second input signal INM may have a negative polarity. In a second period P2 of one period of the touch driving signal, the phase of the first input signal INP may have a negative polarity, and the phase of the second input signal INM may have a positive polarity. Thus, the first input signal INP and the second input signal INM have opposite polarities during the first period P1 and the second period P2.

In each of the first period P1 and the second period P2, the switches included in the first sampling block 221 and the second sampling block 222 may operate at least once, thereby performing sampling.

Further, the switches included in the sampling switching block 223 may operate at least once during one period of the touch driving signal, thereby performing sampling.

For example, the first positive sampling switch swp1 and the second positive sampling switch swp2 included in the sampling switching block 223 may be turned on in the first period P1 corresponding to the period when the phase of the first input signal INP has the positive polarity. The first negative sampling switch swn1 and the second negative sampling switch swn2 included in the sampling switching block 223 may be turned off in the first period P1.

The first negative sampling switch swn1 and the second negative sampling switch swn2 included in the sampling switching block 223 may be turned on in the second period P2 corresponding to the period when the phase of the second input signal INM has the positive polarity. The first positive sampling switch swp1 and the second positive sampling switch swp2 included in the sampling switching block 223 may be turned off in the second period P2.

Accordingly, the first positive sampling switch swp1 and the second positive sampling switch swp2 may be in a turned-on state at the time indicated by ① in the first period P1. Further, the second switch sw2 and the fourth switch sw4 included in the first sampling block 221 and the second sampling block 222 may be in a turned-on state at the time indicated by ① in the first period P1.

The charge according to the first input signal INP may be output, as the second output signal OUTM of the differential amplifier 224, through the first bypass driving path 221b of the first sampling block 221. Further, the charge according to the second input signal INM may be output, as the first output signal OUTP of the differential amplifier 224, through the second bypass driving path 222b of the second sampling block 222.

Since charge is bypassed and transferred to the differential amplifier 224 without being accumulated in the second sampling capacitor Csp2 included in the first bypass driving path 221b and the second bypass driving path 222b, the polarity-inverted signal of the input signal may be output as the output signal. The charge according to the positive first input signal INP may be output as the second output signal OUTM having negative polarity, and the charge according to the negative second input signal INM may be outputted as the first output signal OUTM having positive polarity OUTP.

As such, the output signal of the differential amplifier 224 may be generated at the time indicated by ①.

Before the time indicated by ②, the switches included in the first sampling block 221 and the second sampling block 222 may operate, performing sampling.

For example, during the first period P1, the second switch sw2 and the fourth switch sw4 may be turned off, and the first switch sw1 and the third switch sw3 may be turned on. The period when the first switch sw1 and the third switch sw3 are turned on may not overlap the period when the second switch sw2 and the fourth switch sw4 are turned on. A time gap may exist between the period when the first switch sw1 and the third switch sw3 are turned on and the period when the second switch sw2 and the fourth switch sw4 are turned on.

Since the first switch sw1 and the third switch sw3 are turned on, the charge according to the input signal may be accumulated in the first sampling capacitor Csp1 included in each of the first sample-and-hold driving path 221a and the second sample-and-hold driving path 222a. As the first switch sw1 and the third switch sw3 are turned off and, at the time indicated by ②, the second switch sw2 and the fourth switch sw4 are turned on, the charge accumulated in the first sampling capacitor Csp1 may be output through the differential amplifier 224. Simultaneously, the charge bypassed through the first bypass driving path 221b and the second bypass driving path 222b may be output through the differential amplifier 224.

For example, if the first switch sw1 and the third switch sw3 are turned on, the charge according to the first input signal INP may be accumulated in the first sampling capacitor Csp1 included in the first sample-and-hold driving path 221a. If the first switch sw1 and the third switch sw3 are turned off and the second switch sw2 and the fourth switch sw4 are turned on, the charge accumulated in the first sampling capacitor Csp1 included in the first sample-and-hold driving path 221a may be transferred to the first node N1 and be output as the first output signal OUTP of the differential amplifier 224. Further, since the second switch sw2 and the fourth switch sw4 are turned on, the charge according to the second input signal INM may be polarity-inverted and transferred to the first node N1 through the second bypass driving path 222b and be output as the first output signal OUTP of the differential amplifier 224.

Similarly, the polarity-inverted charge according to the second input signal INM by the second sample-and-hold driving path 222a and the charge according to the first input signal INP by the first bypass driving path 221b may be transferred to the second node N2 and be output as the second output signal OUTM of the differential amplifier 224.

Since the charge is output through the sample-and-hold driving path and bypass driving path through one-time sampling, the magnitude of the output signal of the integrator may increase.

In the second period P2, at the time indicated by ③, the first positive sampling switch swp1 and the second positive sampling switch swp2 may be in the turned-off state, and the first negative sampling switch swn1 and the second negative sampling switch swn2 may be in the turned-on state. Since the second switch sw2 and the fourth switch sw4 included in the first sampling block 221 and the second sampling block 222 are in the turned-on state, an output signal of the differential amplifier 224 may be generated by the charge transferred through the first bypass driving path 221b and the second bypass driving path 222b, similarly to the point indicated by ①.

In the second period P2, the first switch sw1 and the third switch sw3 included in the first sampling block 221 and the second sampling block 222 may be turned on, performing sampling.

Similar to the time indicated by ②, at the time indicated by ④, an output signal of the differential amplifier 224 may be generated according to the charge transferred through the sample-and-hold driving path and the charge polarity-inverted and transferred through the bypass driving path.

The magnitude of the signal output by the integrator 220 may be increased according to the number of times of sampling by the sampling block during one period of the touch driving signal and the driving of the sampling switching block 223. A difference between the first output signal OUTP and the second output signal OUTM output by the integrator 220 may be transferred to the analog-to-digital converter 230.

As such, since the magnitude of the signal output by the integrator 220 increases, the performance of touch sensing by the touch driving circuit 200 may be enhanced.

The magnitude of the output signal of the integrator 220 may be further increased by increasing the number of times in which the sampling block included in the integrator 220 operates.

Referring to FIGS. 2 and 4, FIG. 4 illustrates other examples of a driving scheme of the integrator 220 and a signal output by the integrator 220 during one period of the touch driving signal.

Sampling may be performed twice in the first period P1 of one period of the touch driving signal. The number of times in which the first switch sw1 and the third switch sw3 included in the first sampling block 221 and the second sampling block 222 are turned on for sampling in the first period P1 may be two, for example. The number of times in which the second switch sw2 and the fourth switch sw4 included in the first sampling block 221 and the second sampling block 222 are turned on in the first period P1 may be two, for example. Further, sampling may be performed twice in the second period P2. The number of times in which the first switch sw1 and third switch sw3 and the second switch sw2 and fourth switch sw4 included in the first sampling block 221 and the second sampling block 222 are turned on in the second period P2 may be two, for example.

The switches included in the sampling switching block 223 may operate to correspond to the phase of the touch driving signal.

Accordingly, the output signal of the differential amplifier 224 may be generated by the charge polarity-inverted and transferred through the bypass driving path included in the sampling block at the time indicated by ① and the time indicated by ②.

During the first period P1, sampling may be performed twice by the operations of the first switch sw1 and the third switch sw3.

The output signal of the differential amplifier 224 may be generated by the charge transferred through the sample-and-hold driving path and the charge polarity-inverted through the bypass driving path at the times ② and ③ when the second switch sw2 and the fourth switch sw4 are turned on. The period when the first switch sw1 and the third switch sw3 are turned on and the period when the second switch sw2 and the fourth switch sw4 are turned on may not overlap and, as in the example shown in FIG. 3, a time gap may exist between the two periods.

Similarly, the output signal of the differential amplifier 224 may be generated according to the charge transferred by the sample-and-hold driving path and the bypass driving path at the time indicated by ⑤ and the time indicated by ⑥ according to the operation of the switches included in the sampling block during the second period P2.

As such, sampling may be performed a plurality of times during one period of the touch driving signal. Further, sampling may be performed once during a plurality of periods of the touch driving signal, and sampling may be performed multiple times during a plurality of periods of the touch driving signal. In this case, the reset switch RST may operate once every multiple cycles of the touch driving signal.

As the charge transferred through the sample-and-hold driving path and the bypass driving path is output, the magnitude of the output signal of the integrator 220 may increase. The magnitude of the output signal of the integrator 220 may be increased by increasing the number of operations of the switch included in the sampling block. Further, since the output signal of the differential amplifier 224 is generated according to the operation of the sampling switching block 223, the magnitude of the output signal of the integrator 220 may be increased, and the performance of touch sensing may be enhanced.

Further, noise of the touch sensing signal may be reduced by adjusting the operation timing of the sampling switching block 223.

Figure 5:
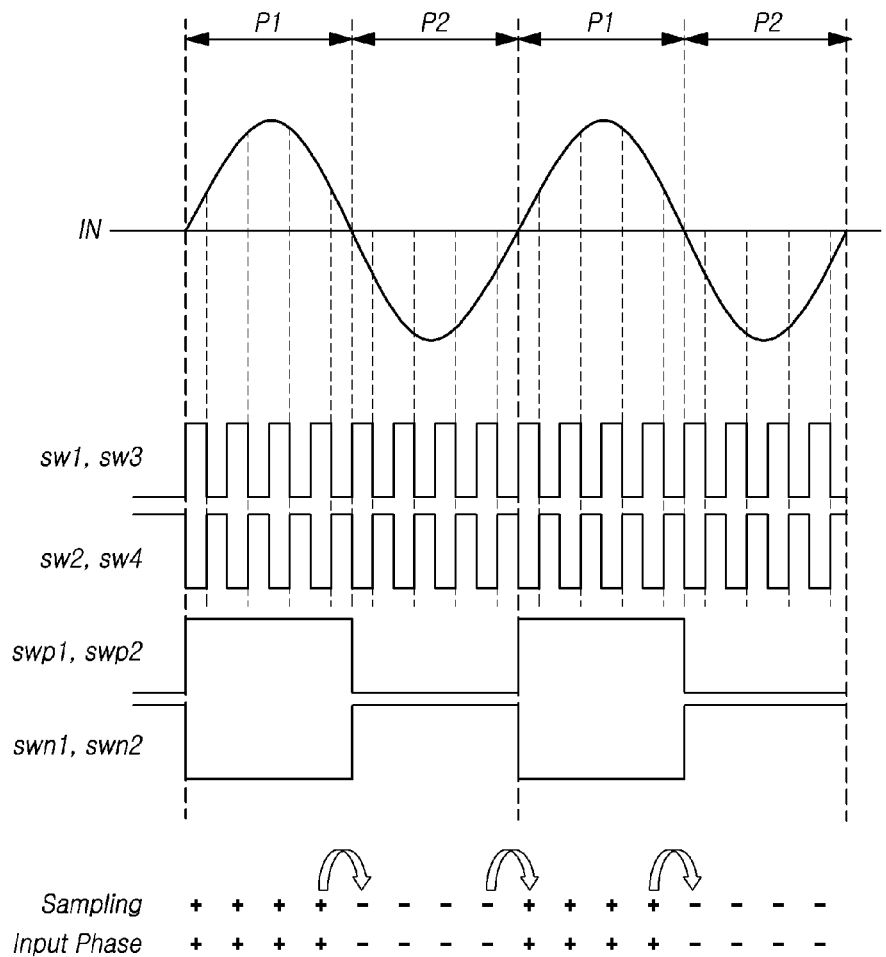
FIGS. 5, 6, 7, and 8 are views illustrating another example of a driving scheme of an integrator according to embodiments of the disclosure.

FIG. 5 shows examples of a driving scheme of switches included in the sampling block of the integrator 220 and a driving scheme of switches included in the sampling switching block 223 during two periods of the input signal IN. For convenience of description, only one input signal IN is illustrated, and an example in which the touch driving signal is a sine wave. The input signal IN shown in FIG. 5 may be a first input signal INP or a second input signal INM. Embodiments of the disclosure may be applied even where the touch driving signal is a square wave, as in the above-described example, and may also be applied where touch sensing is performed by a touch driving signal of another waveform, such as a sine wave or a trapezoidal wave illustrated in FIG. 5.

The example illustrated in FIG. 5 illustrates an example in which the sampling switching block 223 operates once during one period of the touch driving signal, similar to the examples illustrated in FIGS. 3 and 4. In the example shown in FIG. 5, since the sampling switching block 223 operates once during one period of the touch driving signal, the number of times in which the first positive sampling switch swp1 and the second positive sampling switch swp2 included in the sampling switching block 223 during one period of the touch driving signal may be one. The number of times in which the first negative sampling switch swn1 and the second negative sampling switch swn2 included in the sampling switching block 223 are turned on during one period of the touch driving signal may be one. The switches sw1, sw2, sw3, and sw4 included in the sampling blocks 221 and 222 may be turned on by the number of times of sampling during one period of the touch driving signal.

For example, the first positive sampling switch swp1 and the second positive sampling switch swp2 included in the sampling switching block 223 may be turned on in the period corresponding to the first period P1 when the phase of the touch driving signal is positive.

In the first period P1, the phase of the input signal IN may be positive, and in the second period P2, the phase of the input signal IN may be negative.

Since the first positive sampling switch swp1 and the second positive sampling switch swp2 included in the sampling switching block 223 are turned on in the first period P1 and the first negative sampling switch swn1 and the second negative sampling switch swn2 included in the switching block 223 are turned off in the first period P1, sampling may be performed through the path formed by the first positive sampling switch swp1 and second positive sampling switch swp2. In this case, the polarity of the sampling may be referred to as positive.

Since the first negative sampling switch swn1 and the second negative sampling switch swn2 included in the switching block 223 are turned on in the second period P2 and the first positive sampling switch swp1 and the second positive sampling switch swp2 included in the sampling switching block 223 are turned off in the second period P1, sampling may be performed through the path formed by the first negative sampling switch swn1 and the second negative sampling switch swn2. In this case, the polarity of the sampling may be referred to as negative.

If the polarity of sampling is changed by the operation of the sampling switching block 223, noise having the same phase as the input signal IN may be removed. The noise attenuation effect may be increased by diversifying the operation timing of the sampling switching block 223.

Figure 6:
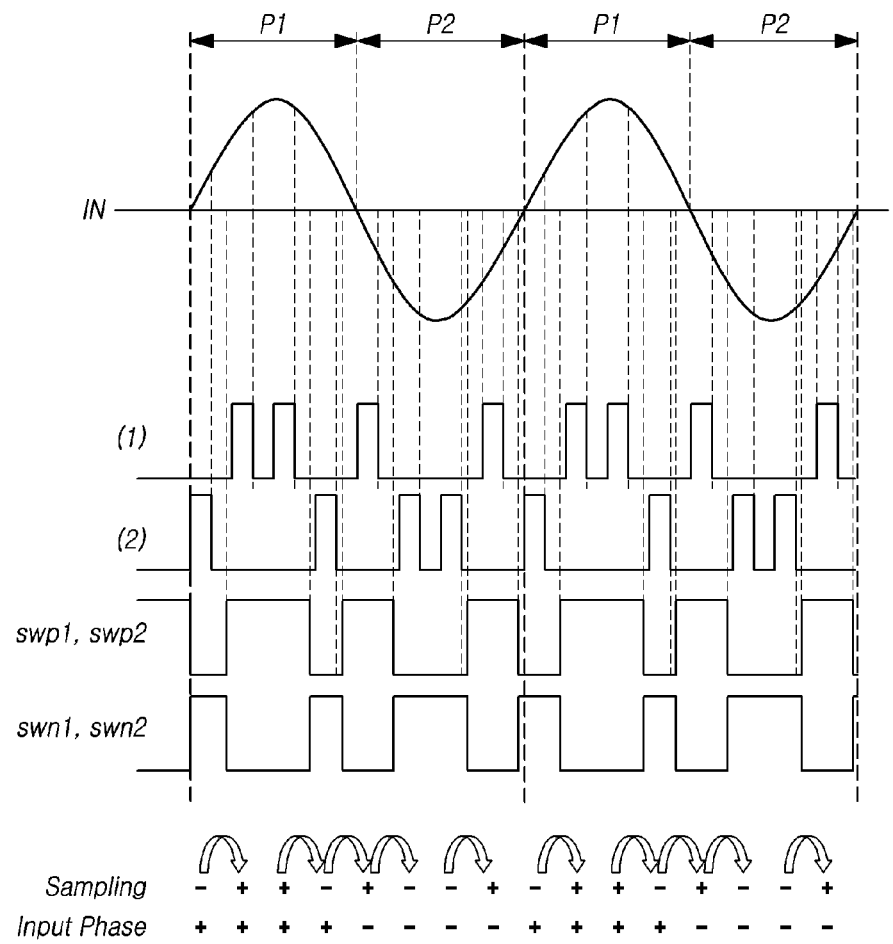

FIG. 6 illustrates an example in which the switches included in the sampling switching block 223 operates a plurality of times during one period of the touch driving signal. (1) and (2) respectively indicate the timing when positive sampling is performed and the timing when negative sampling is performed for convenience of description.

In the first period P1, the first negative sampling switch swn1 and the second negative sampling switch swn2 of the sampling switching block 223 may be turned on to perform negative sampling. Thereafter, the first positive sampling switch swp1 and the second positive sampling switch swp2 may be turned on to perform positive sampling. Further, the polarity of sampling may be changed to negative once in the first period P1 and be changed back to positive once.

In the second period P2, the polarity of the sampling may be changed once to negative and once to positive.

A period when negative sampling is performed may exist in the period corresponding to a portion in which the phase of the touch driving signal is positive. Further, a period when positive sampling is performed may exist in the period corresponding to a portion in which the phase of the touch driving signal is negative.

One period of the touch driving signal may include at least one period when positive sampling is performed and at least one period when negative sampling is performed.

As such, the polarity of the sampling may be changed a plurality of times in one period of the touch driving signal. In the example shown in FIG. 6, the polarity of sampling is changed three times in the middle of one period of the touch driving signal and once at the edge, and the polarity of sampling is changed aperiodically.

Noise attenuation for the frequency around the frequency of the touch driving signal or its higher frequency is possible by inverting the polarity of sampling by the sampling switching block 223. The reduction in the output signal of the integrator 220 by inverting the polarity of sampling may be compensated by increasing the number of times of sampling of the sampling block.

The positions and number of times when the polarity of sampling is inverted by the sampling switching block 223 may be set according to the frequency of the noise.

Figure 7:
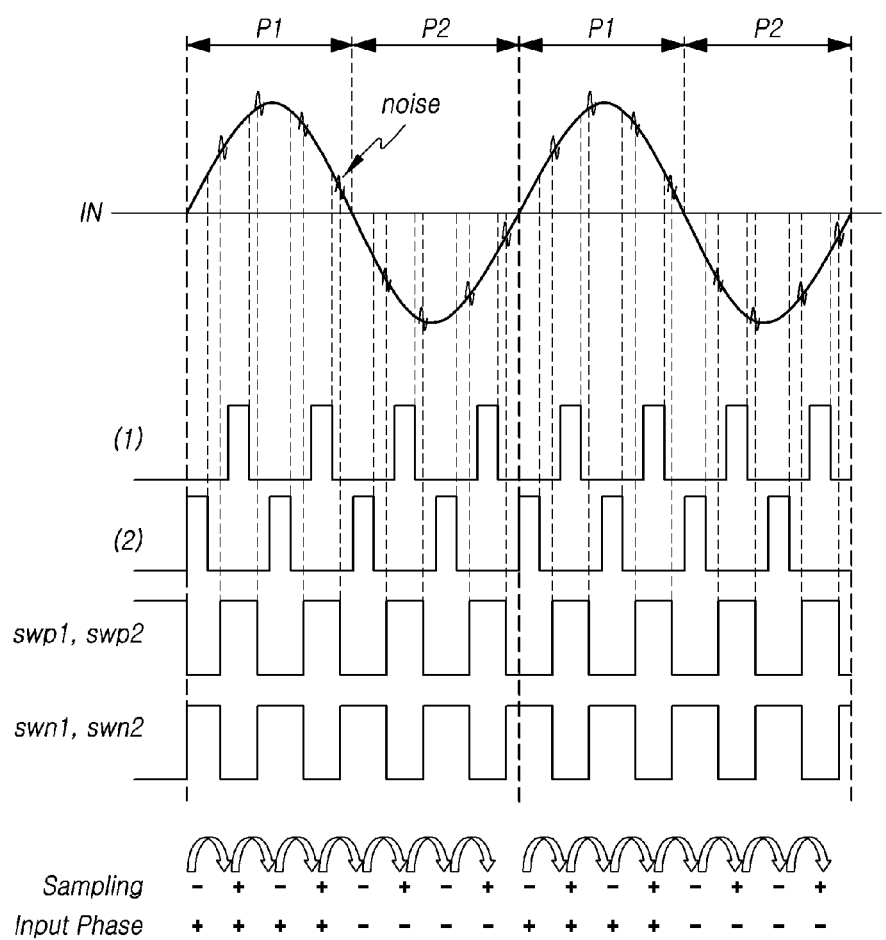
Figure 8:
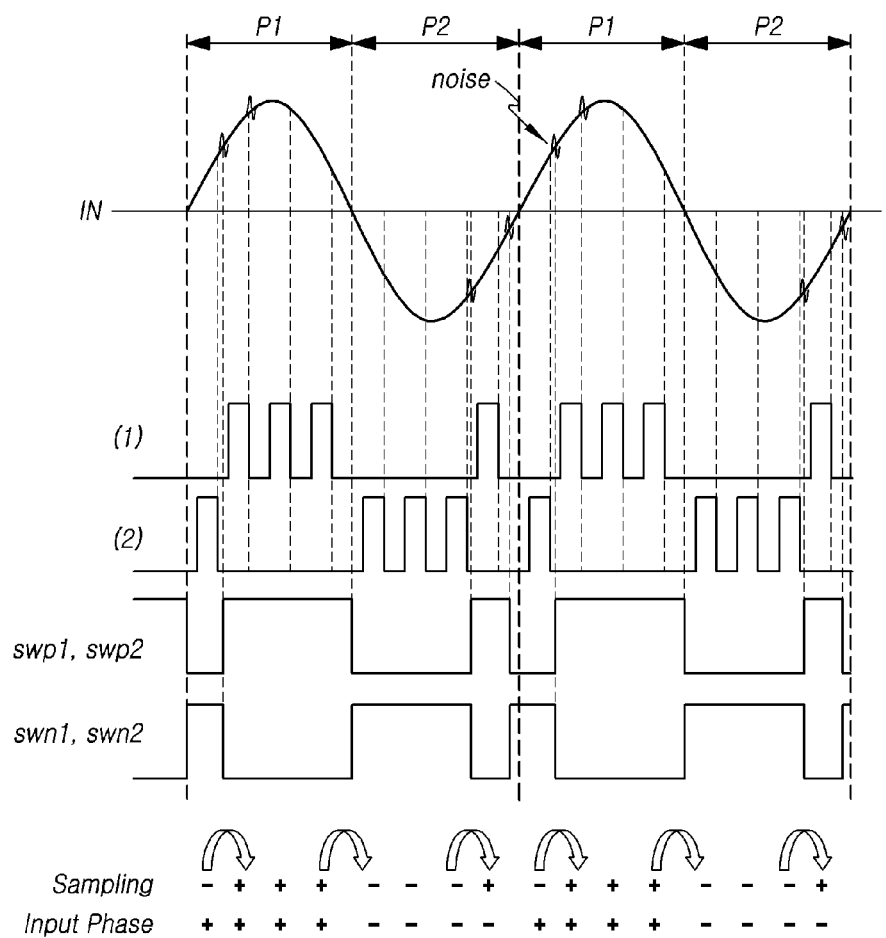

As an example, referring to FIGS. 7 and 8, FIG. 7 and FIG. 8 illustrate an example of the operation timing of the sampling switching block 223 according to the frequency of the noise for the input signal IN.

As in the example shown in FIG. 7, inversion of the polarity of sampling by the sampling switching block 223 may be performed in the position where noise occurs in the frequency of the input signal IN. Inversion of polarity of sampling by the sampling switching block 223 may be periodically performed according to the frequency of noise.

In the example shown in FIG. 8, similar to the example shown in FIG. 7, inversion of the polarity of sampling by the sampling switching block 223 may be performed in the position where noise is generated. Inversion of polarity of sampling by the sampling switching block 223 may be periodically performed according to the frequency of noise.

Since the inversion of polarity of sampling is performed by the sampling switching block 223, the noise of the frequency may be attenuated.

Further, since the number of times of sampling may be increased by the operation of the sampling block, it is possible to remove external noise while compensating for the reduction in the output signal of the integrator 220.

Figure 9:
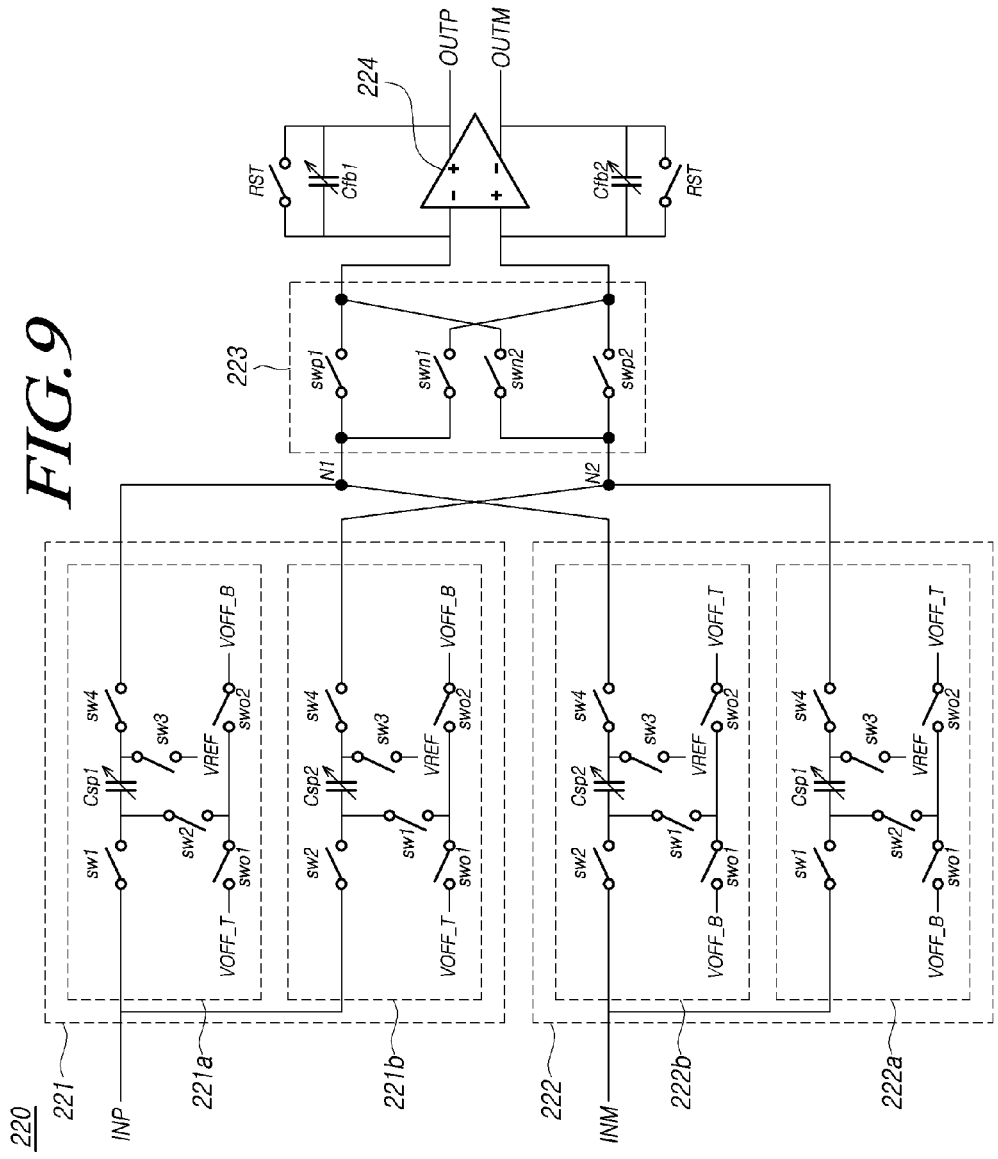
FIG. 9 is a view illustrating another example of a structure of an integrator included in a touch driving circuit of a touch display device according to embodiments of the disclosure.

FIG. 9 is a view illustrating another example of a structure of an integrator 220 included in a touch driving circuit 200 of a touch display device 100 according to embodiments of the disclosure. FIG. 10 is a view illustrating another example of a driving scheme of an integrator 220 according to embodiments of the disclosure.

Referring to FIG. 9, an integrator 220 may include a first sampling block 221, a second sampling block 222, a sampling switching block 223, and a differential amplifier 224. Since the structure and operation scheme of the sampling switching block 223 are the same as those in the above-described example, the related description will be omitted.

The first sampling block 221 may include a first sample-and-hold driving path 221a and a first bypass driving path 221b. The second sampling block 222 may include a second sample-and-hold driving path 222a and a second bypass driving path 222b.

Each of the first sampling block 221 and the second sampling block 222 may include at least one offset voltage control switch swo for controlling the supply of a first offset voltage VOFF_T and a second offset voltage VOFF_B.

For example, the first sample-and-hold driving path 221a of the first sampling block 221 may include the first offset voltage control switch swo1 and the second offset voltage control switch swo2 electrically connected to the second switch sw2. The first offset voltage control switch swo1 may control the supply of the first offset voltage VOFF_T. The second offset voltage control switch swo2 may control the supply of the second offset voltage VOFF_B.

In some cases, the first sample-and-hold driving path 221a may further include an additional offset voltage control switch swo electrically connected to the second switch sw2 to control the supply of the reference voltage VREF. In other words, the first sample-and-hold driving path 221a may be configured to supply at least one voltage among the first offset voltage VOFF_T, the second offset voltage VOFF_B, and the reference voltage VREF to the second switch sw2 through the offset voltage control switch swo.

According to the operation of the first offset voltage control switch swo1 and the second offset voltage control switch swo2, the charge transferred through the first sample-and-hold driving path 221a may be increased or decreased.

For example, referring to FIG. 10, in the first period P1, the first offset voltage control switch swo1 may be turned on, and the second offset voltage control switch swo2 may be turned off.

Since the first offset voltage control switch swo1 is turned on, the second switch sw2 included in the first sample-and-hold driving path 221a may be electrically connected to the input terminal of the first offset voltage VOFF_T.

In the process in which the charge sampled by the first sample-and-hold driving path 221a is transferred, the first switch sw1 and the third switch sw3 may be turned on, so that charge may be accumulated in the first sampling capacitor Csp1. Thereafter, the first switch sw1 and the third switch sw3 may be turned off, and the second switch sw2 and the fourth switch sw4 may be turned on. Since the second switch sw2 and the fourth switch sw4 are turned on, the charge accumulated in the first sampling capacitor Csp1 may be transferred to the first node N1.

Here, while the charge is accumulated, the first sampling capacitor Csp1 is connected to the reference voltage VREF. While the charge is transferred, the first sampling capacitor Csp1 may be connected to the first offset voltage VOFF_T. Accordingly, the charge corresponding to the difference between the reference voltage VREF and the first offset voltage VOFF_T may be increased or decreased and be transferred to the first node N1.

For example, the first offset voltage VOFF_T may be a voltage higher than the reference voltage VREF. The second offset voltage VOFF_B may be a voltage lower than the reference voltage VREF.

By controlling the degree to which the charge sampled by the first sample-and-hold driving path 221a is transferred, it is possible to adjust the output signal of the differential amplifier 224 by Δoffset.

Similarly, the second sample-and-hold driving path 222a may also include at least one offset control switch swo connected to the second switch sw2 to control the supply of the first offset voltage VOFF_T and the second offset voltage VOFF_B.

The first offset voltage control switch swo1 included in the second sample-and-hold driving path 222a may control the supply of the second offset voltage VOFF_B. The second offset voltage control switch swo2 included in the second sample-and-hold driving path 222a may control the supply of the first offset voltage VOFF_T.

Since the second sample-and-hold driving path 222a operates by receiving a signal having a polarity opposite to that of the signal input to the first sample-and-hold driving path 221a, the offset voltage VOFF whose supply is controlled by each of the first offset control switch swo1 and the second offset control switch swo2 may differ from that of the first sample-and-hold driving path 221a.

As such, it is possible to adjust the magnitude of the signal output by the differential amplifier 224 by controlling the supply of the offset voltage VOFF.

The range of the entire offset that may be adjusted by the offset voltage control switch swo may be represented as follows when the first offset voltage VOFF_T is larger than the second offset voltage VOFF_B.

$$\Sigma \Delta \text{offset} = (VOFF\_T - VOFF\_B)/\alpha \times 2 \times N$$

Here, $\alpha$ is the gain of the integrator 220 and may be a ratio of the capacitance of the sampling capacitor Csp to the capacitance of the feedback capacitor Cfb included in the integrator 220. N may mean the number of times in which sampling is performed in one period of the touch driving signal.

In one time of sampling, the amount of charge corresponding to the difference between the first offset voltage VOFF_T and the second offset voltage VOFF_B may be adjusted. The value obtained by dividing the difference between the first offset voltage VOFF_T and the second offset voltage VOFF_B by the gain of the integrator 220 may be accumulated for N times and, since the output signal is doubled by the differential amplifier 224, the range of the entire offset voltage may be represented as described above.

By controlling the operation of the offset voltage control switch swo in the range of the entire offset voltage, the output signal of the integrator 220 may be adjusted.

Therefore, according to embodiments of the disclosure, it is possible to enhance the performance of touch sensing of the touch driving circuit 200 by attenuating noise by the operation of the sampling switching block 223 included in the integrator 220 and adjusting the output signal of the integrator 220 by the offset voltage switch swo while increasing the magnitude of the output signal by multiple times of sampling by the sampling block.

The foregoing embodiments are briefly described below.

A touch display device 100 according to embodiments of the disclosure may comprise a plurality of touch electrodes TE disposed on a display panel 110, a plurality of touch lines TL supplying a touch driving signal to at least one of the plurality of touch electrodes TE and a touch driving circuit 200 configured to drive the plurality of touch lines TL.

The touch driving circuit 200 may include a first sampling block 221 receiving a signal transferred through a first touch line and including a first sample-and-hold driving path 221a and a first bypass driving path 221b, a second sampling block 222 receiving a signal transferred through a second touch line and including a second sample-and-hold driving path 222a and a second bypass driving path 222b, a sampling switching block 223 including a first input terminal electrically connected with the first sample-and-hold driving path 221a and the second bypass driving path 222b and a second input terminal electrically connected with the second sample-and-hold driving path 222a and the first bypass driving path 221b, and a differential amplifier 224 electrically connected with an output terminal of the sampling switching block 223.

The sampling switching block 223 may include a first positive sampling switch swp1 electrically connected between the first input terminal and a first input terminal of the differential amplifier 224, a second positive sampling switch swp2 electrically connected between the second input terminal and a second input terminal of the differential amplifier 224, a first negative sampling switch swn1 electrically connected between the first input terminal and the second input terminal of the differential amplifier 224, and a second negative sampling switch swn2 electrically connected between the second input terminal and the first input terminal of the differential amplifier 224.

The first positive sampling switch swp1 and the second positive sampling switch swp2 may be simultaneously turned on during a positive sampling period, and the first negative sampling switch swn1 and the second negative sampling switch swn2 may be simultaneously turned on during a negative sampling period.

A period corresponding to a positive portion of the touch driving signal may correspond to the positive sampling period, and a period corresponding to a negative portion of the touch driving signal may correspond to the negative sampling period.

A period corresponding to a positive portion of the touch driving signal may include at least one negative sampling period, and a period corresponding to a negative portion of the touch driving signal may include at least one positive sampling period.

During one cycle of the touch driving signal, the positive sampling period and the negative sampling period may alternate two or more times.

During one cycle of the touch driving signal, at least one of the positive sampling period and the negative sampling period may be aperiodic.

Each of the first sample-and-hold driving path 221a and the second sample-and-hold driving path 222a each may include two switches connected to two opposite sides of a sampling capacitor and turned on during periods not overlapping each other.

The first bypass driving path 221b and the second bypass driving path 222b each may include two switches connected to two opposite sides of the sampling capacitor and simultaneously turned on.

One of the two switches included in each of the first sample-and-hold driving path 221a and the second sample-and-hold driving path 222a may be turned on during a period when the two switches included in each of the first bypass driving path 221b and the second bypass driving path 222b are turned on.

The two switches included in the first sample-and-hold driving path 221a, the second sample-and-hold driving path 222a, the first bypass driving path 221b, and the second bypass driving path 222b may be turned on at least two times during one cycle of the touch driving signal.

Each of the first sampling block 221 and the second sampling block 222 may include an offset voltage control switch swo electrically connected with a sampling switch to control supply of at least one of a first offset voltage VOFF_T and a first second voltage VOFF_B.

During a period when the first offset voltage VOFF_T is supplied through the offset voltage control switch swo included in the first sampling block 221, the first second voltage VOFF_B may be supplied through the offset voltage control switch swo included in the second sampling block 222.

A phase of the signal transferred through the first touch line may differ from a phase of the signal transferred through the second touch line.

A touch driving circuit 200 according to embodiments of the disclosure may include a first sampling block 221 receiving a signal transferred through a first touch line and including a first sample-and-hold driving path 221a and a first bypass driving path 221b, a second sampling block 222 receiving a signal transferred through a second touch line and including a second sample-and-hold driving path 222a and a second bypass driving path 222b, a sampling switching block 223 including a first input terminal electrically connected with the first sample-and-hold driving path 221a and the second bypass driving path 222b and a second input terminal electrically connected with the second sample-and-hold driving path 222a and the first bypass driving path 221b, and a differential amplifier 224 electrically connected with an output terminal of the sampling switching block 223.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A touch display device, comprising:
a plurality of touch electrodes included in a display panel;
a plurality of touch lines supplying a touch driving signal to at least one of the plurality of touch electrodes; and
a touch driving circuit configured to drive the plurality of touch lines, the touch driving circuit including:
a first sampling block configured to receive a first signal transferred through a first touch line from the plurality of touch lines, the first sampling block including a first sample-and-hold driving path that is configured to sample the first signal and a first bypass driving path that is configured to bypass the first sample-and-hold driving path and output the first signal;
a second sampling block configured to receive a second signal transferred through a second touch line from the plurality of touch lines, the second sampling block including a second sample-and-hold driving path that is configured to sample the second signal and a second bypass driving path that is configured to bypass the second sample-and-hold driving path and output the second signal;
a sampling switching block including a first input terminal and a second input terminal, the first input terminal electrically connected with the first sample-and-hold driving path and the second bypass driving path, and the second input terminal electrically connected with the second sample-and-hold driving path and the first bypass driving path; and
a differential amplifier electrically connected with an output terminal of the sampling switching block.

2. The touch display device of claim 1, wherein the sampling switching block includes:
a first positive sampling switch electrically connected between the first input terminal of the sampling switch block and a first input terminal of the differential amplifier;
a second positive sampling switch electrically connected between the second input terminal of the sampling switch block and a second input terminal of the differential amplifier;

a first negative sampling switch electrically connected between the first input terminal of the sampling switch block and the second input terminal of the differential amplifier; and a second negative sampling switch electrically connected between the second input terminal of the sampling switch block and the first input terminal of the differential amplifier.

3. The touch display device of claim 2, wherein the first positive sampling switch and the second positive sampling switch are simultaneously turned on during a positive sampling period, and the first negative sampling switch and the second negative sampling switch are simultaneously turned on during a negative sampling period.

4. The touch display device of claim 3, wherein a period corresponding to a positive portion of the touch driving signal corresponds to the positive sampling period during which the first positive sampling switch and the second positive sampling switch are simultaneously turned on, and a period corresponding to a negative portion of the touch driving signal corresponds to the negative sampling period during which the first negative sampling switch and the second negative sampling switch are simultaneously turned on.

5. The touch display device of claim 4, wherein the period corresponding to the positive portion of the touch driving signal includes at least one negative sampling period during which the first negative sampling switch and the second negative sampling switch are simultaneously turned on, and the period corresponding to the negative portion of the touch driving signal includes at least one positive sampling period during which the first positive sampling switch and the second positive sampling switch are simultaneously turned on.

6. The touch display device of claim 3, wherein during one cycle of the touch driving signal, the positive sampling period and the negative sampling period alternate a plurality of times, or
during one cycle of the touch driving signal, at least one of the positive sampling period and the negative sampling period is aperiodic.

7. The touch display device of claim 1, wherein each of the first sample-and-hold driving path and the second sample-and-hold driving path respectively include a first switch connected to a first side of a first sampling capacitor and a second switch connected to a second side of the sampling capacitor, wherein the first switch is not turned on while the second switch is turned on, and
wherein each of the first bypass driving path and the second bypass driving path respectively include a third switch connected to a first side a second sampling capacitor and a fourth switch connected to a second side of the second sampling capacitor, wherein the third switch and the fourth switch are simultaneously turned on.

8. The touch display device of claim 7, wherein the second switch respectively included in each of the first sample-and-hold driving path and the second sample-and-hold driving path is turned on while the third switch and the fourth switch respectively included in each of the first bypass driving path and the second bypass driving path are turned on.

9. The touch display device of claim 7, wherein the first switch and the second switch respectively included in each of the first sample-and-hold driving path and the second sample-and-hold driving path, and the third switch and the fourth switch respectively included in each of the first bypass driving path and the second bypass driving path are turned on a plurality of times during one cycle of the touch driving signal.

10. The touch display device of claim 1, wherein each of the first sampling block and the second sampling block respectively includes an offset voltage control switch that is electrically connected with a sampling switch, the offset voltage control switch and the sampling switch configured to control supply of at least one of a first offset voltage and a second offset voltage to the sampling switching block.

11. The touch display device of claim 10, wherein during a period during which the first offset voltage is supplied through the offset voltage control switch and the sampling switch included in the first sampling block, the second offset voltage is supplied through the offset voltage control switch and the sampling switch included in the second sampling block.

12. The touch display device of claim 1, wherein a phase of the first signal transferred through the first touch line is different from a phase of the second signal transferred through the second touch line.

13. A touch driving circuit, comprising:
a first sampling block configured to receive a first signal transferred through a first touch line, the first sampling block including a first sample-and-hold driving path that is configured to sample the first signal and a first bypass driving path that is configured to bypass the first sample-and-hold driving path and output the first signal;
a second sampling block configured to receive a second signal transferred through a second touch line, the second sampling block including a second sample-and-hold driving path that is configured to sample the second signal and a second bypass driving path that is configured to bypass the second sample-and-hold driving path and output the second signal;
a sampling switching block including a first input terminal electrically and a second input terminal, the first input terminal connected with the first sample-and-hold driving path and the second bypass driving path, and the second input terminal electrically connected with the second sample-and-hold driving path and the first bypass driving path; and
a differential amplifier electrically connected with an output terminal of the sampling switching block.

14. A touch display device, comprising:
a plurality of touch electrodes included in a display panel;
a plurality of touch lines supplying a touch driving signal to at least one of the plurality of touch electrodes; and
a touch driving circuit configured to drive the plurality of touch lines, the touch driving circuit including:
a plurality of sampling blocks, each sampling block connected to a corresponding touch line from the plurality of touch lines;
a differential amplifier including a plurality of input terminals and an output terminal; and
a switch block having a plurality of input terminals that are connected to the plurality of sampling blocks and a plurality of output terminals that are connected to the plurality of input terminals of the differential amplifier, the switch block configured to switch connection of each of the plurality of sampling blocks to different input terminals of the plurality of input terminals of the differential amplifier,
wherein each of the plurality of sampling blocks is configured to either sample a touch sensing signal on the corresponding touch line that is connected to the sampling block or bypass the touch sensing signal to the switch block, and a magnitude of an output signal at the output terminal of the differential amplifier is based on a number of times each of the plurality of sampling blocks sample the touch sensing signal.

15. The touch display device of claim 14, wherein the magnitude of the output signal increases as the number of times each of the plurality of sampling blocks sample the touch sensing signal increases.

16. The touch display device of claim 14, wherein the plurality of sampling blocks includes:
   a first sampling block configured to receive a first touch sensing signal transferred through a first touch line from the plurality of touch lines, the first sampling block including a first sample-and-hold driving path that is configured to sample the first touch sensing signal and a first bypass driving path that is configured to bypass the first sample-and-hold driving path and output the first touch sensing signal to the switch block; and
   a second sampling block configured to receive a second touch sensing signal transferred through a second touch line from the plurality of touch lines, the second sampling block including a second sample-and-hold driving path that is configured to sample the second touch sensing signal and a second bypass driving path that is configured to bypass the second sample-and-hold driving path and output the second touch sensing signal to the switch block.

17. The touch display device of claim 16, wherein the plurality of input terminals of the switch block including a first input terminal and a second input terminal, the first input terminal electrically connected with the first sample-and-hold driving path and the second bypass driving path, and the second input terminal electrically connected with the second sample-and-hold driving path and the first bypass driving path.

18. The touch display device of claim 17, wherein the switch block includes:
   a first positive sampling switch electrically connected between the first input terminal of the switch block and a first input terminal from the plurality of input terminals of the differential amplifier;
   a second positive sampling switch electrically connected between the second input terminal of the switch block and a second input terminal from the plurality of input terminals of the differential amplifier;
   a first negative sampling switch electrically connected between the first input terminal of the switch block and the second input terminal of the differential amplifier; and
   a second negative sampling switch electrically connected between the second input terminal of the switch block and the first input terminal of the differential amplifier.

19. The touch display device of claim 18, wherein the first positive sampling switch and the second positive sampling switch are simultaneously turned on during a positive sampling period, and the first negative sampling switch and the second negative sampling switch are simultaneously turned on during a negative sampling period.

20. The touch display device of claim 19, wherein a period corresponding to a positive portion of the touch driving signal corresponds to the positive sampling period during which the first positive sampling switch and the second positive sampling switch are simultaneously turned on, and a period corresponding to a negative portion of the touch driving signal corresponds to the negative sampling period during which the first negative sampling switch and the second negative sampling switch are simultaneously turned on, and
   wherein the period corresponding to the positive portion of the touch driving signal includes at least one negative sampling period during which the first negative sampling switch and the second negative sampling switch are simultaneously turned on, and the period corresponding to the negative portion of the touch driving signal includes at least one positive sampling period during which the first positive sampling switch and the second positive sampling switch are simultaneously turned on.

* * * * *